(12) United States Patent
Barrus

(10) Patent No.: US 7,607,101 B1
(45) Date of Patent: Oct. 20, 2009

(54) METHOD AND APPARATUS FOR COMMUNICATING USING A DISPLAY

(75) Inventor: Frank E. Barrus, New Ipswich, NH (US)

(73) Assignee: Sun Microsystems, Inc., Santa Clara, CA (US)

( * ) Notice: Subject to any disclaimer, the term of this patent is extended or adjusted under 35 U.S.C. 154(b) by 1024 days.

(21) Appl. No.: 10/670,117

(22) Filed: Sep. 24, 2003

Related U.S. Application Data

(60) Provisional application No. 60/423,730, filed on Nov. 4, 2002.

(51) Int. Cl.
  *G06F 3/048* (2006.01)
  *G06F 3/03* (2006.01)
(52) U.S. Cl. .................. 715/768; 715/797; 715/790; 715/791
(58) Field of Classification Search .......... 715/711, 715/705
See application file for complete search history.

(56) References Cited

U.S. PATENT DOCUMENTS

| | | | | |
|---|---|---|---|---|
| 5,936,608 A | * | 8/1999 | Springer | 345/690 |
| 6,353,451 B1 | * | 3/2002 | Teibel et al. | 715/803 |
| 7,046,254 B2 | * | 5/2006 | Brown et al. | 345/592 |
| 2003/0142140 A1 | * | 7/2003 | Brown et al. | 345/803 |
| 2003/0214534 A1 | * | 11/2003 | Uemura et al. | 345/805 |
| 2004/0056900 A1 | * | 3/2004 | Blume | 345/807 |

* cited by examiner

*Primary Examiner*—Weilun Lo
*Assistant Examiner*—Steven B Theriault

(57) ABSTRACT

Disclosed is a visual method of communicating an abnormal situation (e.g., the crashed or downed state) of the computer system including a display. The system status is thus indicated to the user. Upon a system crash or downed state, the display entirely or in part (a first area) is proportionally decreased in brightness. Brightness of a second area (which may overlap the first area) is increased in full or in part by a fixed amount. This results in a translucent film overlay which preserves in the background the display screen content existing at the moment the system crashed. The translucent film overlay may have predefined characteristics, such as tint to signify system status and/or level or degree of the system's problem.

15 Claims, 2 Drawing Sheets

METHOD AND APPARATUS FOR COMMUNICATING USING A DISPLAY

RELATED APPLICATION

This application claims the benefit of U.S. Provisional Application No. 60/423,730, filed on Nov. 4, 2002. The entire teachings of the above application are incorporated herein by reference.

BACKGROUND OF THE INVENTION

This invention generally relates to the computer user interface technologies.

Conventionally, most computers systems that have a display exhibit one of several behaviors when they crash, i.e. reach an abnormal condition. To name a few examples, the crashed (or down) computer system (1) clears the screen and replaces it with a useful message; (2) attempts to display a pop up dialog box concerning the crash; (3) resets; or (4) maintains a locked state, making the system useless, with no other clues to the user about what happened.

Each of these methods has certain disadvantages. With regard to example (2) above, since the computer system has effectively crashed, the system might not be able to properly generate or display new windows or dialog boxes. In examples (3) and (4), the user is not sure what just happened, and no further useful information is conveyed. In examples (1), (2), and (3), some or all of the information on the screen is lost, and there may be critical data that the user is concerned with, and this might be the last chance for the user to read this data.

SUMMARY OF THE INVENTION

The present invention, a visual method and apparatus for communicating the down or crashed state of the computer system having a display, overcomes the problems of the prior art.

In a preferred embodiment, the image on the entire monitor screen is darkened by decreasing the brightness of every pixel by a factor of two, then a constant amount of brightness is added to the red component of every pixel. These steps effectively result in a translucent red film overlaid on the image that existed on the screen immediately before the crash. In other embodiments of the present invention, the color of the translucent film may be different or vary depending on the cause and circumstances of the crash. In other embodiments of the present invention, the shape of the darkened areas and the areas overlaid with the translucent film may differ and their shapes may communicate a message to the user of the computer system. This message may be in the form of text or picture and the contours of the image carrying the message are established by the boundaries of the areas of darkening and overlaying. The original content of the display screen is viewable by the user of the computer system in these embodiments.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
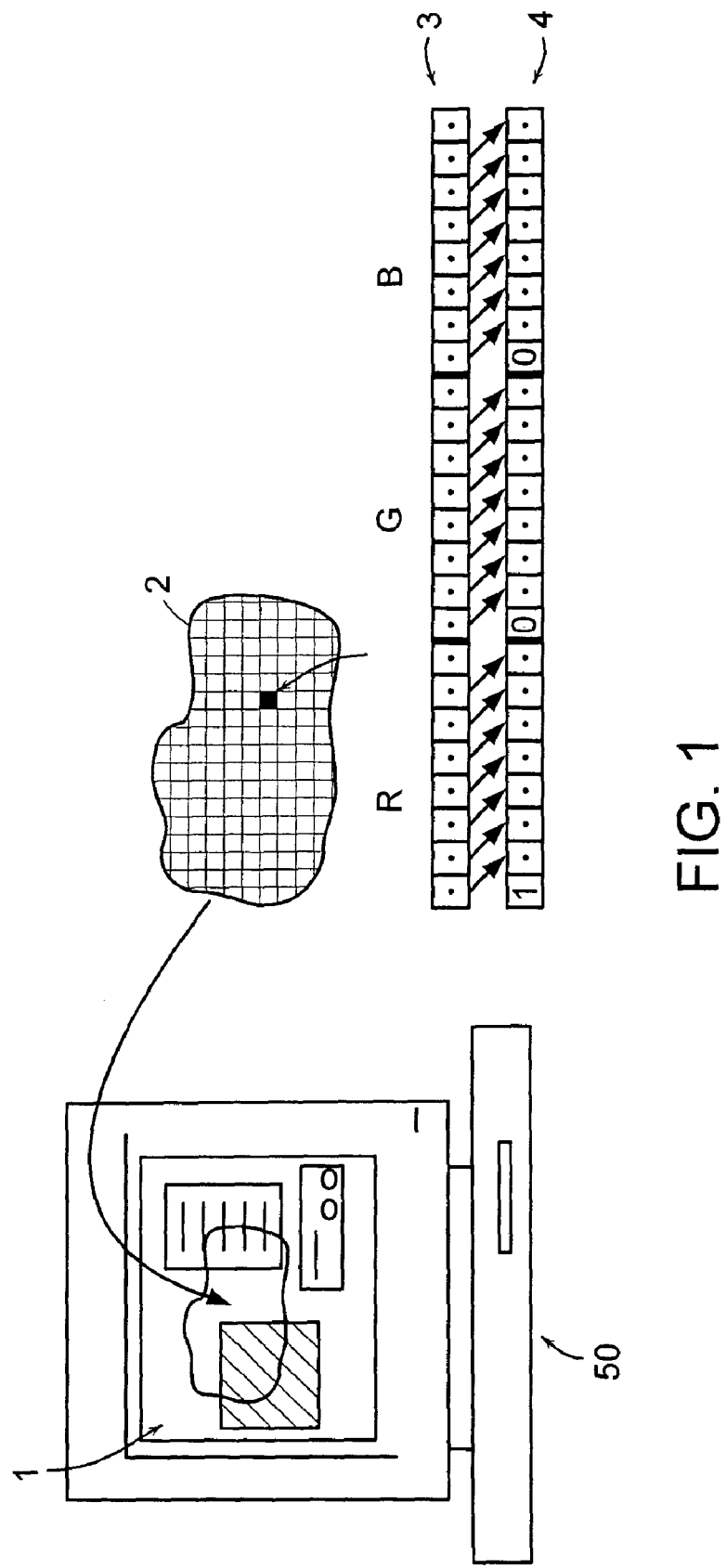
FIG. 1 is a schematic illustration of an embodiment of the invention.

FIG. 1 illustrates a preferred embodiment of the invention implementing a method of effectively covering a computer system screen 1 with a translucent film. The translucent screen is of a predefined character (such as color or hue) that signifies to the user the downed or crashed state of the computer system 50.

In one embodiment the format of the display screen 1 includes an RGB (red/green/blue) value expressed in 24 bits per pixel. The brightness of each red/green/blue component is expressed as an 8 bit number. In the present invention, the computer system 50 iterates through each of the pixels 2 of the display screen 1. For each pixel 2, the system 50 obtains the subject pixel's RGB value 3 (Old RGB Value), and applies the following logic, to arrive at a New RGB Value 4:

New RGB Value=((Old RGB Value >>1) & 0x7F7F7F)) |0x800000

This expression shifts all the bits one bit toward the least significant bit. This causes bits from the red and green color components to shift into the green and blue color components. However, since the next step of the invention method takes only the least significant 7 bits of each color component, the shifting is acceptable. Furthermore, the shifting of bits combined with taking only the least significant 7 bits allows the invention to darken all three components in a single step.

The shifting by one bit effectively divides the individual RGB components for each pixel 2 by two, thus darkening the display screen 1. Next the above algorithm turns the display screen 1 hue to red, i.e. adds a red tint to it, by adding 0x800000 to the RGB value. This effectively adds 0x80 to the red component of each pixel 2. As a result, the display screen 1 is effectively covered by a red translucent film, with original display data darkened but visible through or behind the red translucent film in the foreground.

In other embodiments of the invention, other values could be substituted for the 0x800000 to tint the display screen 1 with other colors by setting the high bit or bits of the color component or components one wishes to emphasize as the filter color. The color of the tint may by itself convey to the user the idea that something has gone wrong. In other embodiments of the invention, red may be a color indicating a serious crash and yellow may indicate a more minor warning that might be recoverable.

In other embodiments of the invention, the number of components per pixel, the number of bits per pixel can be different, and the function and color assigned to each component may differ from the preferred embodiment described above. It is understood that the above logic of the present invention would then be adjusted and applied accordingly.

In other embodiments of the invention, the darkening and coloring or tinting of the screen view may be done not on the entire screen, as in the preferred embodiment described above, but only on some portion or areas, the areas of darkening and areas of tinting not necessarily coinciding.

In other embodiments of the invention, the darkening may be performed using a factor other than 2, as in the preferred embodiment described above. This factor may be different for different components, or some components may remain in their original unaltered condition entirely.

In other embodiments of the invention, once the display screen 1 is darkened and colored or tinted, relatively bright text may be printed over it and be clearly readable. Such text conveys the status of the system 50, available options and the like to the end user. The original screen contents is preserved effectively in the background and the system status, etc. text is supplied in the foreground (translucent film overlay) in a manner that minimally disrupts (occludes) the original display contents.

In other embodiments of the invention, the location and shape of darkened and colored or tinted areas may be chosen so that these areas communicate a message. For example, the tint can be applied only in selected areas or locations so that the overall result is a darkened screen view with the word "Error" or a stop sign shaped by applying the translucent hued, tinted, or colored film to some areas and excluding it from other areas. This method allows the error message to be readable or viewable while only minimally disturbing the original display image. This would allow the user to continue viewing the information present on the display screen 1 when the system 50 crashed without being obstructed by an informative error message simultaneously present on the screen after the crash.

Although the exact techniques used to apply the invention translucent film over the display screen 1 could vary, the general mechanism of its use to convey information while retaining the previous display should still apply to such modifications.

Figure 2:
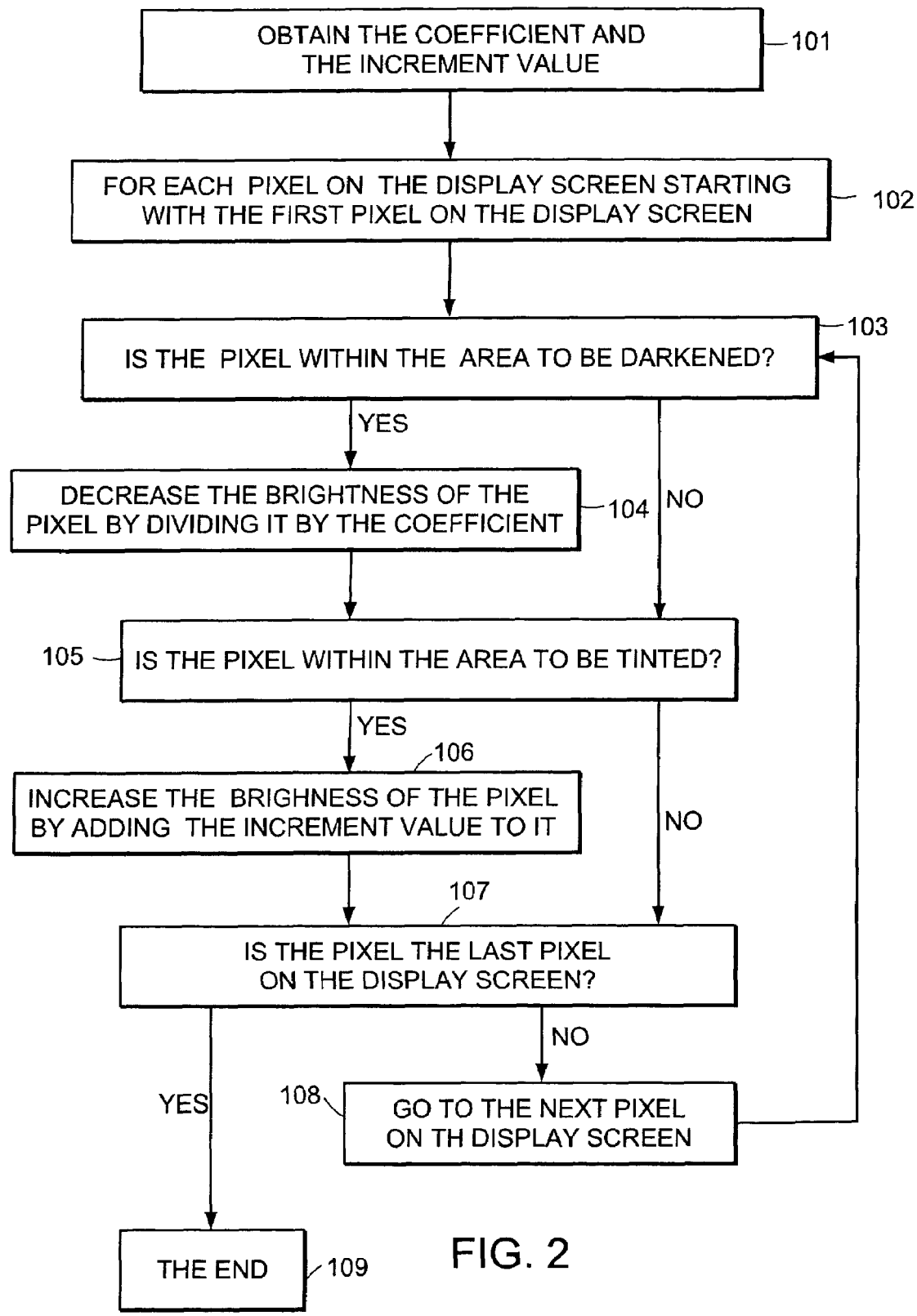
FIG. 2 is a flow chart of an embodiment of the invention.

FIG. 2 illustrates a preferred embodiment of the invention. At step 101, a computer system implementing the invention obtains the coefficient determining how much the original image on the display screen is darkened when the pixels' brightness is proportionally decreased. This coefficient must be greater than one. Also at step 101, the computer system obtains the increment value equal to the fixed amount by which the pixels' brightness will be increased. At step 102, the iteration mechanism starts with the first pixel of the display screen. At step 103, the system checks whether the pixel under consideration is within the area of the display screen where brightness is proportionally decreased. If it is within this area, then, at step 104, the pixel's brightness is decreased by dividing it by the coefficient obtained in step 101. At step 105, the system checks whether the pixel under consideration is within the area of the display screen where brightness is increased by the fixed amount. If it is within this area, then, at step 106, the pixel's brightness is increased by adding to it the increment value obtained in step 101. At step 107, the system checks whether the pixel under consideration is the last pixel on the display screen. If it is the last pixel, the system exits the algorithm (step 109). Otherwise, the system chooses the next pixel on the display screen, at step 108 and iterates back to step 103 for repeating steps 104-108 for each pixel.

Although the exact techniques used to implement this algorithm could vary, the general mechanism of its use to convey information while retaining the previous display should still apply to such modifications.

Those of ordinary skill in the art should recognize that methods involved in the present invention may be embodied in a computer program product that includes a computer usable medium. For example, such a computer usable medium can include a readable memory device, such as a solid state memory device, a hard drive device, a CD-ROM, a DVD-ROM, or a computer diskette, having stored computer-readable program code segments. The computer readable medium can also include a communications or transmission medium, such as a bus or a communications link, either optical, wired, or wireless, carrying program code segments as digital or analog data signals.

Other apparatuses or subsystems (programmed logic arrays, processor chips, combinations of hardware, software, etc.) may embody or implement the invention method described above.

While the invention has been particularly shown and described with references to particular embodiments, it will be understood by those of ordinary skill in the art that various changes in form and details may be made without departing from the scope of the invention encompassed by the appended claims. For example, the methods of the invention can be applied to various environments and display devices (e.g., mobile devices, handheld devices various screen monitors, etc.), and are not limited to the described computer system (stand alone or network) environment.

What is claimed is:

1. A method of communicating with a user of a display screen of a computer system, the method comprising:
   obtaining a coefficient, wherein the coefficient determines a brightness decrease of a pixel;
   obtaining an increment value, wherein the increment value determines a tint color of a pixel;
   responsive to an abnormal condition of the computer system:
      decreasing brightness of each pixel of a first area on the display screen, wherein the brightness of each pixel is decreased by shifting an RGB value of each pixel by the coefficient; and
      tinting each pixel of a second area on the display screen, wherein each pixel in the second area is tinted by adding the increment value to an RGB value of each pixel,
      wherein the first area and the second area comprise all contents of the display screen when the abnormal condition occurred, and
      wherein the contents of the display screen remain visible to the user.

2. The method of claim 1 wherein the pixels of decreased brightness in the first area and the tinted pixels in the second area are configured to display a text message to the user.

3. The method of claim 1 wherein the tint color of the pixels in the second area is selected based on the abnormal condition.

4. The method of claim 1 wherein the first area and the second area are a same area.

5. The method of claim 1 wherein the pixels of decreased brightness in the first area and the tinted pixels in the second area are configured to display a symbol to the user.

6. A method of communicating with a viewer of a multi-component color display screen of a computer system, the method comprising:
   obtaining a coefficient, wherein the coefficient determines a brightness decrease of a pixel;
   obtaining an increment value, wherein the increment value determines a brightness increase of a pixel;
   responsive to an abnormal condition of the computer system:
      decreasing the brightness of a color component of each pixel within a first area on the display screen, wherein decreasing the brightness comprises shifting an RGB value of each pixel by the coefficient; and
      increasing the brightness of the color component of each pixel within a second area on the display screen, wherein increasing the brightness comprises adding the increment value to an RGB value of each pixel, wherein each pixel in the second area displays a same tint color, wherein the first area and the second area comprise all contents of the display screen when the abnormal condition occurred, and wherein the contents of the display screen remain visible to the viewer.

7. The method of claim 6 wherein the pixels of decreased brightness in the first area and the tinted pixels of the second area are configured to display a text message to the viewer.

8. The method of claim 6 wherein the increment value is selected based on the abnormal condition.

9. The method of claim 6 wherein the first area and the second area are a same area.

10. The method of claim 6 wherein the pixels of decreased brightness within the first area and the tinted pixels within the second area are configured to display a symbol to the viewer.

11. A system comprising:

a display screen;

a computing device coupled to the display screen, wherein the computing device, in response to an abnormal event, decreases brightness of each pixel of a first area on the display screen, wherein the brightness of each pixel is decreased by shifting an RGB value of each pixel by a same coefficient, and tints each pixel of a second area on the display screen, wherein each pixel in the second area is tinted by adding a same increment value to an RGB value of each pixel, wherein the first area and the second area comprise all contents of the display screen when the abnormal condition occurred, and wherein the contents of the display screen remain visible to a user.

12. The system of claim 11 wherein the pixels of decreased brightness in the first area and the tinted pixels in the second area are configured to display a text message to the user.

13. The system of claim 11 wherein the increment value is selected based on the abnormal condition.

14. The system of claim 11 wherein the first area and the second area are a same area.

15. The system of claim 11 wherein the pixels of decreased brightness in the first area and the tinted pixels in the second area are configured to display a symbol to the user.

* * * * *